(12) United States Patent
Kanematsu et al.

(10) Patent No.: US 11,353,236 B2
(45) Date of Patent: Jun. 7, 2022

(54) SHUTTER AND AIR BLOWER

(71) Applicant: Panasonic Intellectual Property Management Co., Ltd., Osaka (JP)

(72) Inventors: Daisuke Kanematsu, Aichi (JP); Yasuaki Shima, Aichi (JP); Shuto Nonoshita, Aichi (JP); Naoyuki Funada, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 515 days.

(21) Appl. No.: 16/360,083

(22) Filed: Mar. 21, 2019

(65) Prior Publication Data

US 2019/0301769 A1   Oct. 3, 2019

(30) Foreign Application Priority Data

Mar. 28, 2018   (JP) .............................. JP2018-061159

(51) Int. Cl.
*F24F 13/14* (2006.01)
*F24F 13/06* (2006.01)
*F24F 7/10* (2006.01)
*F16K 15/03* (2006.01)

(52) U.S. Cl.
CPC ................ *F24F 13/14* (2013.01); *F24F 7/10* (2013.01); *F24F 13/06* (2013.01); *F16K 15/03* (2013.01)

(58) Field of Classification Search
None
See application file for complete search history.

(56) References Cited

U.S. PATENT DOCUMENTS

| 1,744,798 A | * | 1/1930 | Price | F16K 1/226 137/902 |
| 2,711,188 A | * | 6/1955 | Nickerson | F16K 15/03 251/359 |
| 3,672,630 A | * | 6/1972 | Naumburg | A47L 5/38 251/149.2 |

(Continued)

FOREIGN PATENT DOCUMENTS

| EP | 1630486 A3 * | 11/2006 | ............ F24F 13/14 |
| JP | 51-138047 A | 11/1976 | |

(Continued)

*Primary Examiner* — Edelmira Bosques
*Assistant Examiner* — Frances F. Hamilton
(74) *Attorney, Agent, or Firm* — Renner, Otto, Boisselle & Sklar, LLP

(57) ABSTRACT

Provided is a shutter comprising a main body and a shaft bearing. The main body has a substantially circular plate shape, and, in a closed state to close a passage, a front face of the main body is located upstream of a back face thereof in the passage. The shaft bearing is rotatably engaged with a shaft configured to divide the passage into a main passage and a sub-passage in an open state to open the passage, the sub-passage having a cross-sectional area smaller than that of the main passage. The main body includes: a main-passage-side end located in the main passage in the closed state; and a bent portion bent at the main-passage-side end in a direction from the back face side to the front face side. A parallel cross-section of the main body, the cross-section being taken along a parting plane parallel to the shaft, has a circular arc shape bowed toward the back face side from the front face side.

9 Claims, 11 Drawing Sheets

(56) References Cited

U.S. PATENT DOCUMENTS

| | | | | |
|---|---|---|---|---|
| 3,945,398 | A * | 3/1976 | Masheder | F16K 1/222 |
| | | | | 137/527.8 |
| 4,301,833 | A * | 11/1981 | Donald, III | F16K 17/28 |
| | | | | 137/527 |
| 4,480,815 | A * | 11/1984 | Kreij | F16K 1/222 |
| | | | | 251/298 |
| 4,512,366 | A * | 4/1985 | Lewis | A61F 2/2403 |
| | | | | 137/527.8 |
| 4,523,609 | A * | 6/1985 | Weck | F16K 1/221 |
| | | | | 137/499 |
| 4,993,886 | A * | 2/1991 | Hofstetter | B65G 53/66 |
| | | | | 406/192 |
| 5,099,877 | A * | 3/1992 | Fluegel | F16K 15/03 |
| | | | | 137/527 |
| 5,406,977 | A * | 4/1995 | Barbarin | F24F 11/75 |
| | | | | 137/514 |
| 5,941,021 | A * | 8/1999 | Valls, Jr | E06B 7/086 |
| | | | | 49/92.1 |
| 6,582,293 | B1 * | 6/2003 | Siniarski | B60H 1/3414 |
| | | | | 454/155 |
| 7,993,886 | B2 * | 8/2011 | Hoefer | C12P 13/02 |
| | | | | 435/129 |
| 8,776,889 | B2 * | 7/2014 | Smith | E21B 34/102 |
| | | | | 166/332.8 |
| 8,826,593 | B2 * | 9/2014 | Baek | F24F 13/14 |
| | | | | 49/92.1 |
| 9,128,490 | B2 * | 9/2015 | Sadkowski | G01F 1/363 |
| 9,157,652 | B2 * | 10/2015 | Chamness | F24F 11/75 |
| 9,897,214 | B2 * | 2/2018 | Bensel | F16K 1/2014 |
| 10,036,566 | B2 * | 7/2018 | Vanden Bosch | F24F 11/75 |
| 10,423,172 | B2 * | 9/2019 | Niederhauser | G01F 1/6842 |
| 10,465,939 | B2 * | 11/2019 | Penlesky | F24F 13/10 |
| 10,914,489 | B2 * | 2/2021 | Nogami | F24F 13/14 |
| 2003/0121664 | A1 * | 7/2003 | Hill, Jr. | E21B 34/10 |
| | | | | 166/332.8 |
| 2009/0163132 | A1 * | 6/2009 | Ikari | F04D 25/14 |
| | | | | 454/284 |
| 2010/0178863 | A1 * | 7/2010 | Coward | F24F 11/75 |
| | | | | 454/333 |
| 2012/0171949 | A1 * | 7/2012 | Baik | F24F 11/76 |
| | | | | 454/333 |
| 2014/0206276 | A1 * | 7/2014 | Zhong | F24F 13/24 |
| | | | | 454/317 |
| 2015/0140923 | A1 * | 5/2015 | Penlesky | F24F 7/007 |
| | | | | 454/322 |
| 2018/0087801 | A1 * | 3/2018 | Nogami | F24F 13/1426 |

FOREIGN PATENT DOCUMENTS

| | | |
|---|---|---|
| JP | 03839689 B2 | 8/2006 |
| JP | 2007-333221 A | 12/2007 |
| JP | 2008-070048 A | 3/2008 |
| JP | 2014-137218 A | 7/2014 |

* cited by examiner

SHUTTER OPENING DIRECTION

FIG. 8A
FIG. 8B
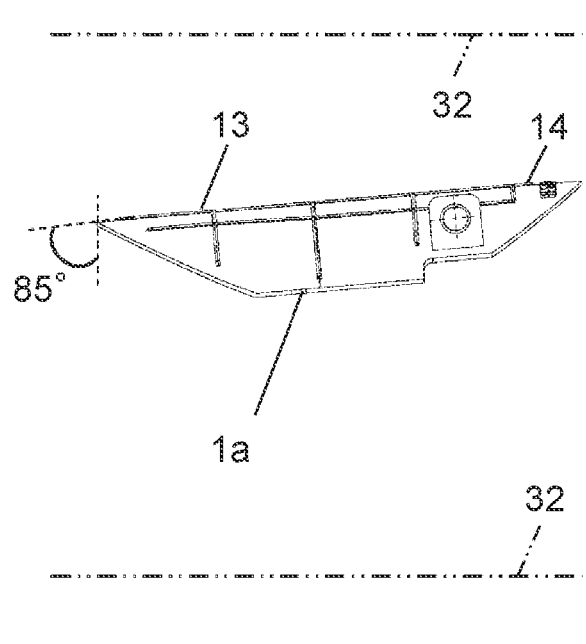
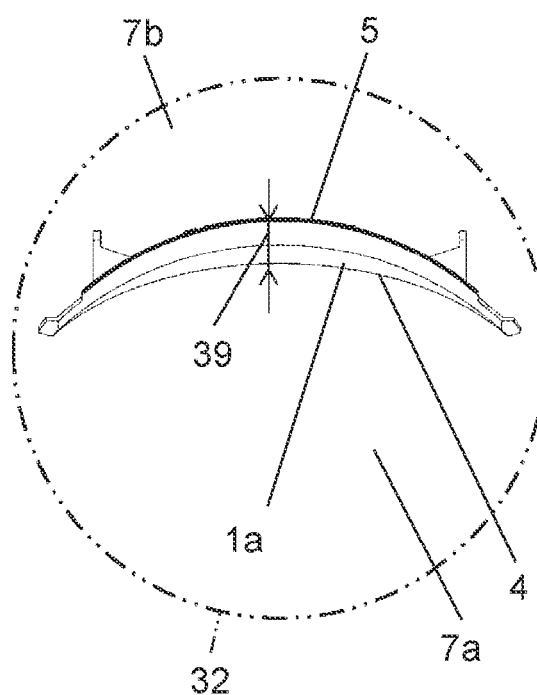

FIG. 9A
FIG. 9B
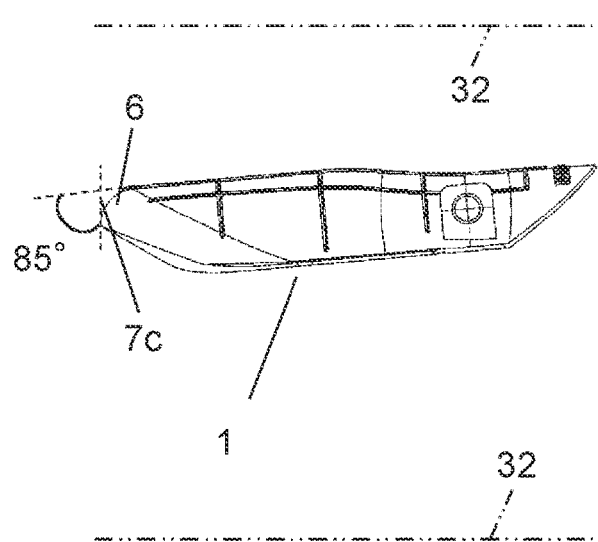
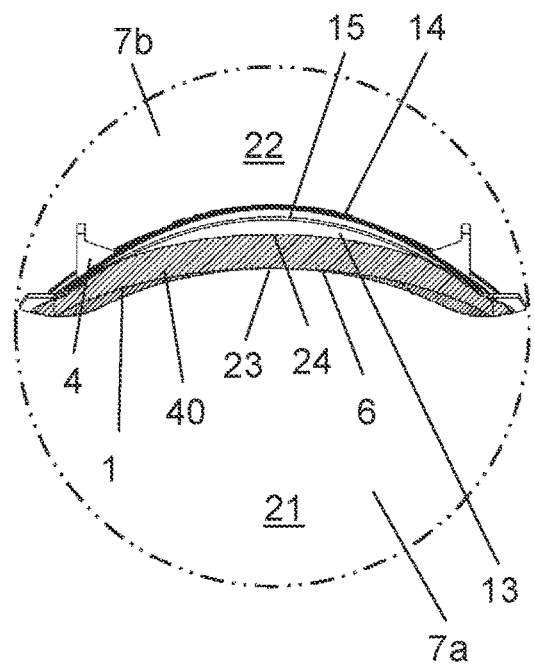

SHUTTER AND AIR BLOWER

BACKGROUND

1. Technical Field

The present invention relates to a shutter configured to be installed in, for example, a ceiling of a building and used for, for example, a ventilation fan to ventilate a room by exhausting air, and relates to an air blower including the shutter.

2. Description of Related Art

Japanese Patent No. 3839689 discloses a shutter and, as an air blower, a ventilation fan including the shutter.

Hereinafter, the shutter and the ventilation fan will be described with reference to FIG. 11.

Shutter 101 includes main body 102 and shaft bearing 103 coupled to main body 102. Shutter 101 is arranged inside cylindrical adapter 109. Adapter 109 demarcates a passage through which an air current flows from upstream to downstream.

Shutter holder 110 is detachably mounted inside adapter 109. Shutter holder 110 includes a shaft to be fitted in shaft bearing 103, and shutter stop 112.

When receiving a wind pressure generated by an air current, shutter 101 rotates upon shaft bearing 103 to an open position to open the passage. In contrast, when receiving no air-current, shutter 101 rotates to a closed position under its own weight to close the passage.

SUMMARY

A shutter according to embodiments of the present invention is configured to open and close a cylindrical passage through which an air current flows from upstream to downstream. The shutter includes a main body and a shaft bearing. The main body has the shape of a substantially circular plate, and, when the shutter is in a closed state to close the cylindrical passage, the front face of the main body is located upstream of the back face of the main body in the cylindrical passage. The shaft bearing is rotatably engaged with a shaft. The shaft is configured to divide the cylindrical passage into a main passage and a sub-passage having a cross-sectional area smaller than that of the main passage when the shutter is in an open state to open the cylindrical passage. The main body includes: a main-passage-side end located inside the main passage when the shutter is in the closed state; and a bent portion bent at the main-passage-side end in a direction from the back face side to the front face side. Furthermore, a parallel cross-section of the main body, the cross-section being taken along a parting plane parallel to the shaft, has the shape of a circular arc bowed toward the back face side from the front face side.

The shutter according to the embodiments of the present invention is capable of maintaining the main body at an open position even when the wind velocity of an air current, that is, the wind pressure thereof is low. This shutter is capable of reducing pulsating sounds of air currents owing to flapping of the main body during operation.

BRIEF DESCRIPTION OF DRAWINGS

FIG. 8A is a side view of the shutter according to Modification.

FIG. 8B is a parallel cross-sectional view of the shutter according to Modification.

FIG. 9A is a side view of the shutter according to Embodiment 1.

FIG. 9B is a parallel cross-sectional view of the shutter according to Embodiment 1.

DETAILED DESCRIPTION

Figure 11:
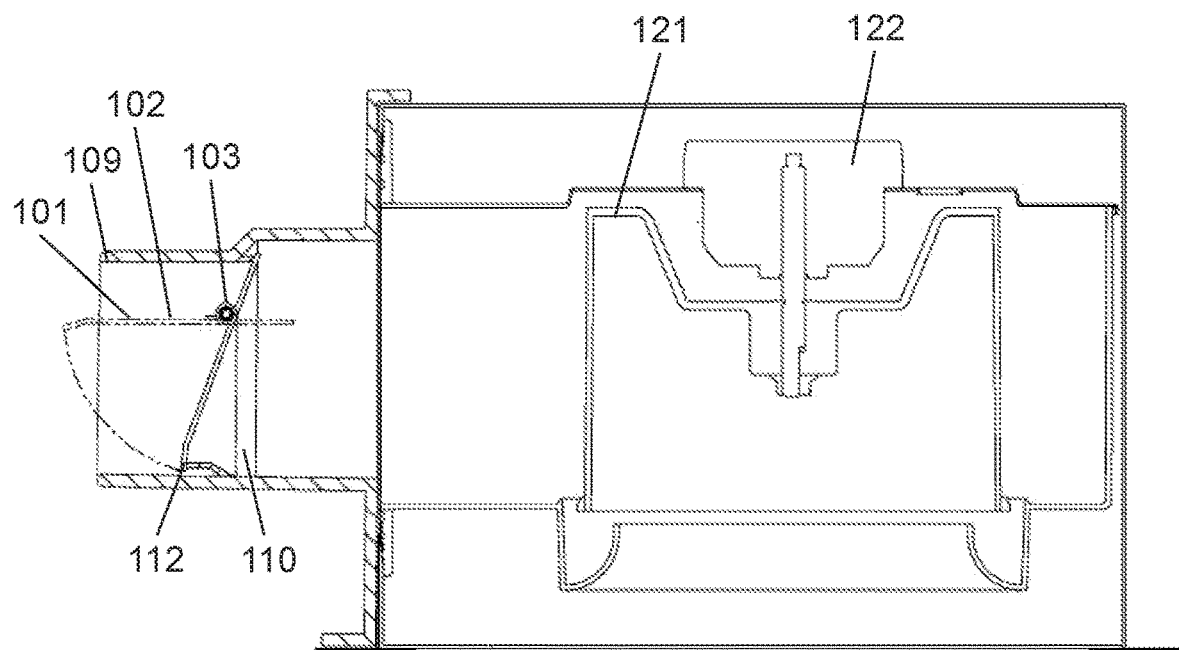
FIG. 11 is a cross-sectional view of a conventional ventilation fan.

A conventional shutter illustrated in FIG. 11 is in need of some improvements. For example, shutter 101 is required to silently operate.

When receiving a wind pressure generated by an air current, shutter 101 rotates from a closed position to an open position. At the open position, shutter 101 is at an angle at which shutter 101 is less likely to receive a wind pressure. This sometimes hinders shutter 101 from remaining at the open position and thereby causes shutter 101 to close under its own weight. At the closed position, shutter 101 is at an angle at which shutter 101 easily receive a wind pressure. Once shutter 101 closes, then shutter 101 opens again by receiving a wind pressure. The repetition of such cycle causes pulsating sounds of air currents due to intermittent air-discharging.

Furthermore, when a ventilation fan exercises constant airflow rate control, this problem sometimes more obviously comes up. The ventilation fan includes exhaust fan 121 and motor 122 configured to drive and rotate exhaust fan 121. The rotation of exhaust fan 121 causes an air current (also referred to as an exhaust wind) to generate. When the exhaust wind collides with shutter 101, shutter 101 rotates to the open position. When shutter 101 is opened to the open position, air can be discharged. This caused an increase in the load on exhaust fan 121, a decrease in the rotation speed of exhaust fan 121, and an increase in the power consumption of motor 122.

Under the constant airflow rate control, a controller adjusts an exhaust volume, based on the relationship between the rotation speed of exhaust fan 121 and the power consumption of motor 122. Although shutter 101 is opened to bring about a state of readiness to discharge air, the controller determines that the exhaust volume is increased too much. Accordingly, the controller lowers the output of motor 122 to reduce the exhaust volume, and as a result, shutter 101 is sometimes closed.

In particular, when the wind velocity of an exhaust wind is low, the above-mentioned cycle occurs, whereby shutter 101 is repeatedly opened and closed to cause pulsating sounds of air currents. Furthermore, when shutter 101 is repeatedly opened and closed, shutter 101 repeatedly comes into contact with shutter stop 112. This contact sometimes causes a contact sound.

As described above, when the wind velocity of an air current is low, shutter 101 fails to maintain the open state, and is closed under its own weight, whereby pulsating sounds of the air current and a sound owing to a contact with shutter stop 112 are sometimes caused.

Hereinafter, with reference to the drawings, embodiments of the present invention will be described for understanding of the present invention. Note that the following embodiments are merely specific examples of the present invention, and do not limit the technical scope of the present invention. In all of the drawings, the same constituent elements will be given the same reference numerals, respectively, and the repetition of the same description thereof will be avoided. Furthermore, in each of the drawings, detailed descriptions of constituent elements that are not directly related to the present invention will be omitted.

Embodiment 1

Figure 1:
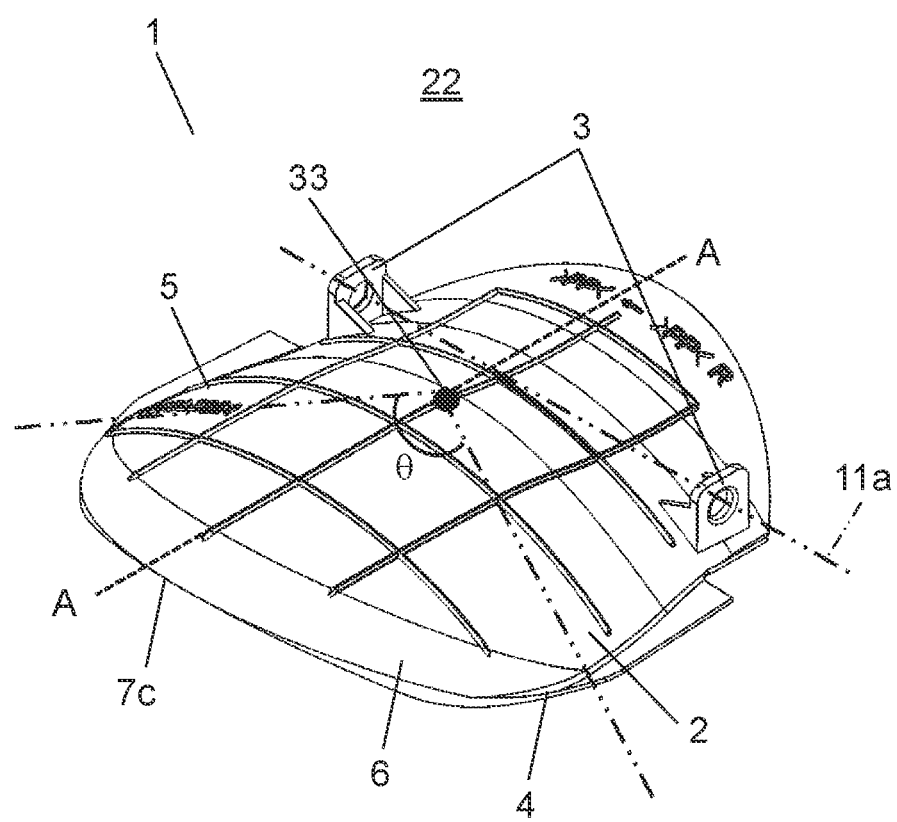
FIG. 1 is a perspective view of a shutter according to Embodiment 1 of the present invention.
Figure 2A:
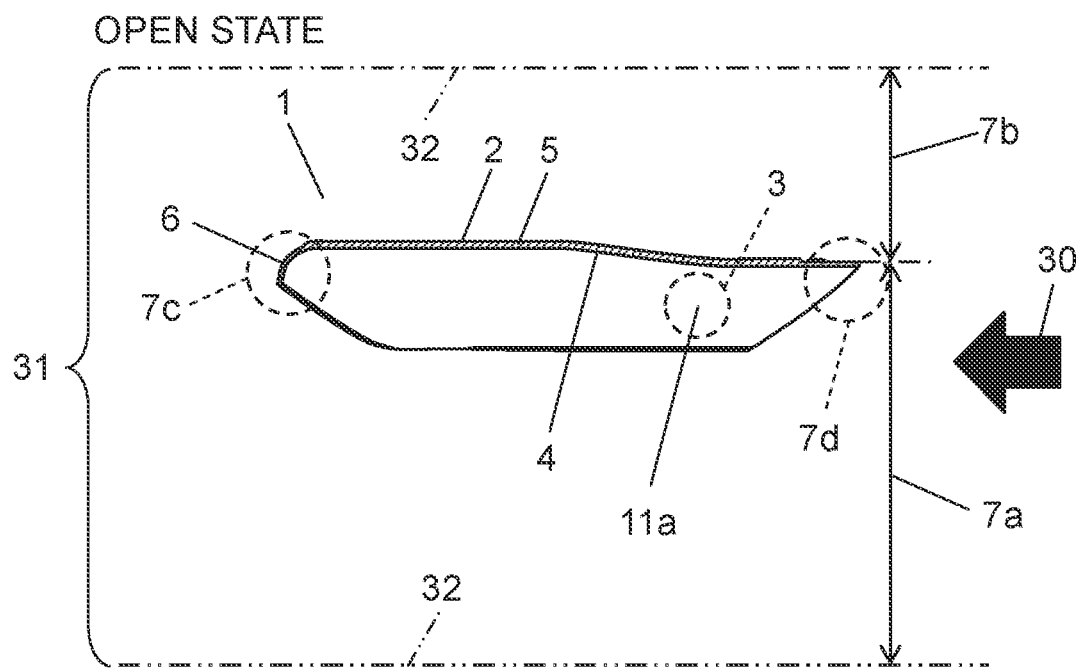
FIG. 2A is a vertical cross-sectional view of the shutter in an open state.
Figure 2B:
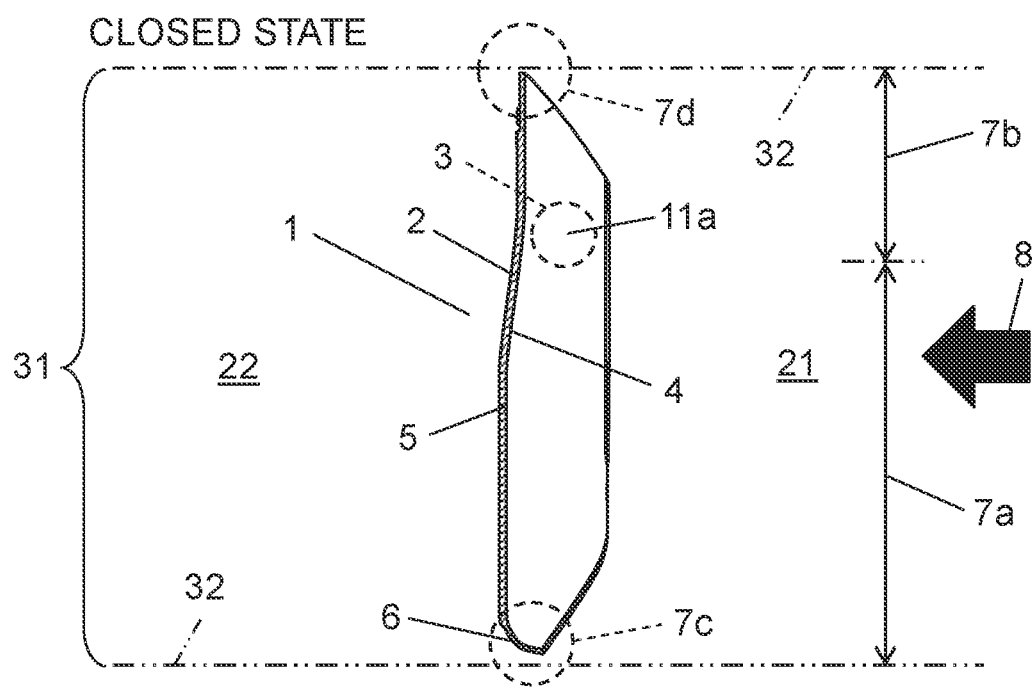
FIG. 2B is a vertical cross-sectional view of the shutter in a closed state.
Figure 3A:
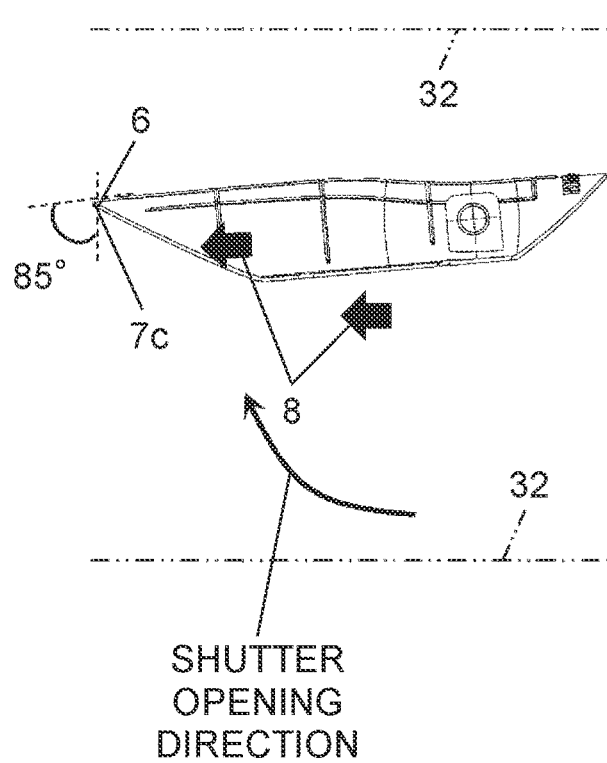
FIG. 3A is a side view of the shutter according to Embodiment 1.
Figure 3B:
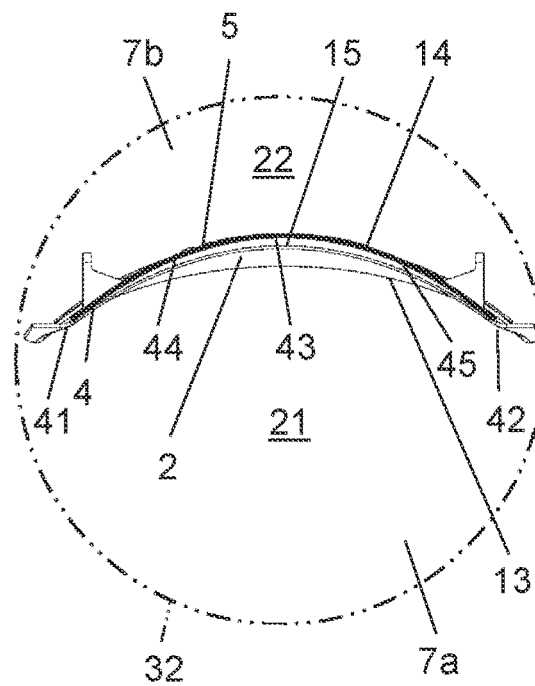
FIG. 3B is a parallel cross-sectional view of the shutter according to Embodiment 1.

First, a schematic configuration of shutter 1 according to Embodiment 1 of the present invention will be described using FIG. 1, FIG. 2A, FIG. 2B, FIG. 3A, and FIG. 3B. Note that FIG. 1 is a perspective view of shutter 1 according to Embodiment 1 of the present invention. FIG. 2A and FIG. 2B are vertical cross-sectional views of shutter 1. FIG. 2A illustrates shutter 1 in an open state. FIG. 2B illustrates shutter 1 in a closed state. FIG. 3A is a side view of shutter 1 according to Embodiment 1. FIG. 3B is a parallel cross-sectional view of shutter 1 according to Embodiment 1. FIG. 3A and FIG. 3B illustrates shutter 1 in the open state. In FIG. 3A and FIG. 3B, later-mentioned bent portion 6 is omitted.

Line A-A in FIG. 1 is the center line of shutter 1. Cross sections illustrated in FIG. 2A and FIG. 2B are cross-sections of shutter 1, the cross-sections being taken at the center line (Line A-A) along a parting plane vertical to rotation axis 11a of the shutter, and are referred to as a vertical cross-section. A cross section illustrated in FIG. 3B is a cross-section of shutter 1, the cross-section being taken at rotation axis 11a of the shutter along a parting plane parallel to rotation axis 11a of the shutter, and is referred to as a parallel cross-section. The cross-section illustrated in FIG. 3B is also a cross-section of passage 31.

As illustrated in FIG. 2A and FIG. 2B, shutter 1 is arranged inside passage 31 having a cylindrical shape, for example. Through passage 31, air current 30 flows from upstream to downstream. Rotation axis 11a is horizontally arranged. Shutter 1 is configured to open and close passage 31, based on a balance between a force received from air current 30 and gravity acting on shutter 1. Specifically, shutter 1 is installed in an air blower 119, as shown in FIG. 11, such as a ceiling-embedded ventilation fan or a ventilator. The air blower 119 includes: an air blowing unit 120 (shown in FIG. 11); passage 31 through which air current 30 sent from the air blowing unit 120 flows; and shutter 1 arranged inside passage 31. The air blowing unit 120 includes, for example, exhaust fan 121 and motor 122, each being illustrated in FIG. 11. The air blowing unit is capable of exercising constant airflow rate control.

Note that cylindrical passage 31 means a passage whose transverse section is circular and whose longitudinal section is rectangular. The transverse section indicates a cross section obtained by cutting passage 31 by a plane vertical to the direction of a wind. The longitudinal section indicates a cross section obtained by cutting passage 31 by a plane parallel to the direction of a wind. However, the shape of the transverse section is not necessarily a perfect circle. The shape of the transverse section of the passage may be, for example, an ellipse or a polygon. Such shape is also regarded as a cylindrical shape as long as the shape allows shutter 1 to be opened and closed. In other words, the cylindrical shape in the present embodiment is a substantially cylindrical shape.

A state in which shutter 1 has opened passage 31 is referred to as an open state (FIG. 2A). A state in which shutter 1 has closed passage 31 is referred to as a closed state (FIG. 2B). The open state includes a fully open state described later, and a half-open state between the fully open state and the closed state.

As illustrated in FIG. 1, shutter 1 includes main body 2 and shaft bearing 3 coupled to main body 2.

Main body 2 is made of resin, for example. Specifically, polypropylene resin which is lightweight and flexible can be made use of as a material of main body 2. Main body 2 is a substantially circular plate. Main body 2 includes front face 4 facing forward 21, back face 5 facing rearward 22, and bent portion 6.

Air current 30 is generated by the air blowing unit, and flows from upstream to downstream through passage 31 surrounded by passage inner wall 32. Front face 4 is a face facing upstream when shutter 1 is in the closed state. Furthermore, front face 4 is located upstream of back face 5 in passage 31. Air current 30 is configured to collide with front face 4 of shutter 1 in the closed state. Furthermore, front face 4 fronts on main passage 7a described later when shutter 1 is in the open state.

Back face 5 is the flip side of front face 4. Back face 5 fronts on sub-passage 7b described later when shutter 1 is the open state.

Main passage 7a is one, having a larger passage area, of passages obtained by dividing passage 31 into two passages by shutter 1 when shutter 1 is in the fully open state. The passage area used herein is the area of a transverse section of passage 31. As illustrated in FIG. 3B, in the transverse section of passage 31, main passage 7a has the shape of an arch whose base corresponds to main body 2. Note that the fully open state indicates a degree of opening of shutter 1 at the time when air current 30 in the maximum amount in an expected range collides with shutter 1. In the present embodiment, the fully open state indicates a state in which main body 2 of shutter 1 is located substantially parallel to air current 30. As a projected area of shutter 1 is smaller, ventilation resistance caused by shutter 1 is lower, and thus, exhaust performance can be prevented from decreasing. The projected area is the area of a projected figure formed by projecting shutter 1 from upstream to downstream in passage 31.

Sub-passage 7b is another one, having a smaller passage area, of the passages obtained by dividing passage 31 into two passages by shutter 1 when shutter 1 is in the fully open state. In other words, sub-passage 7b is a passage having a cross-sectional area smaller than that of main passage 7a. As illustrated in FIG. 3B, in the transverse section of passage 31, sub-passage 7b has the shape of an arch whose base corresponds to main body 2.

As illustrated in FIG. 2B, main body 2 includes main-passage-side end 7c located in main passage 7a when shutter 1 is in the closed state. Bent portion 6 is a portion bent at main-passage-side end 7c in a direction from the back face 5 side to the front face 4 side. In other words, main-passage-side end 7c is bent forward 21. As illustrated in FIG. 1, main body 2 has center 33 based on a substantially circular shape. Bent portion 6 is formed in the range of an angle θ of rotation on center 33. Main-passage-side end 7c is arranged within this range. The angle θ is in a range of 90° or larger and less than 180°. Note that, in FIG. 1, the angle θ is 160°. Center 33 is substantially in agreement with the center of the transverse section of passage 31 (the center axis of passage 31).

Here, as illustrated in FIG. 2B, an end opposite to main-passage-side end 7c of shutter 1 is defined as sub-passage-side end 7d. Note that the main passage side and the sub-passage side indicate respective positions at the time when shutter 1 is in the closed state, but, main-passage-side end 7c and sub-passage-side end 7d shall indicate respective positions (portions) of shutter 1, regardless of whether shutter 1 is in the open state or in the closed state, unless otherwise specified.

Shutter 1 includes two shaft bearings 3 coupled to main body 2. Two shaft bearings 3 are parts configured to rotatably fix main body 2 to respective two shafts 11 described later (see FIG. 5). Two shafts 11 protrude from passage inner wall 32. These shaft bearings 3 may be mainly made of resin, or may be made of polypropylene resin as in the case of main body 2. Shaft bearings 3 may be integrally molded with main body 2. Shaft bearings 3 are each provided in later-mentioned short side 14 so as to protrude from back face 5 as a starting point in the direction that becomes more distant from back face 5. In other words, each of shaft bearings 3 is a protruding piece provided in short side 14 so as to protrude from back face 5 as a starting point in the direction that becomes more distant from back face 5. Each of shaft bearings 3 includes an insertion hole that allows a corresponding one of shafts 11 to be inserted thereinto. Each of two shafts 11 is inserted into a corresponding one of insertion holes of shaft bearings 3. Shutter 1 is shaft-supported so as to be allowed to rotate inside passage 31 upon an axis connecting two shaft bearings 3. Here, shaft bearings 3 and shafts 11 are not arranged on a straight line (diameter) passing through the center of a circular cross-section of passage 31, but are arranged closer to one semicircular arc side. Accordingly, when main body 2 rotates on the axis in the opening direction, passage 31 is divided into main passage 7a having a larger passage area and sub-passage 7b having a smaller passage area.

As illustrated in FIG. 3B, main body 2 has the shape of a circular arc bowed toward the back face 5 side from the front face 4 side in a parallel cross-section of shutter 1. In other words, in the parallel cross-section of shutter 1, front face 4 includes first end 41, second end 42, and center 43. Second end 42 is located opposite to first end 41. Center 43 is located between first end 41 and second end 42, and located rearward 22 of first end 41 and second end 42. Thus, main body 2 includes first inclined face 44 located between first end 41 and center 43, and second inclined face 45 located between second end 42 and center 43. The circular arc shape is provided over the whole from sub-passage-side end 7d of main body 2 through main-passage-side end 7c of main body 2.

Figure 4:
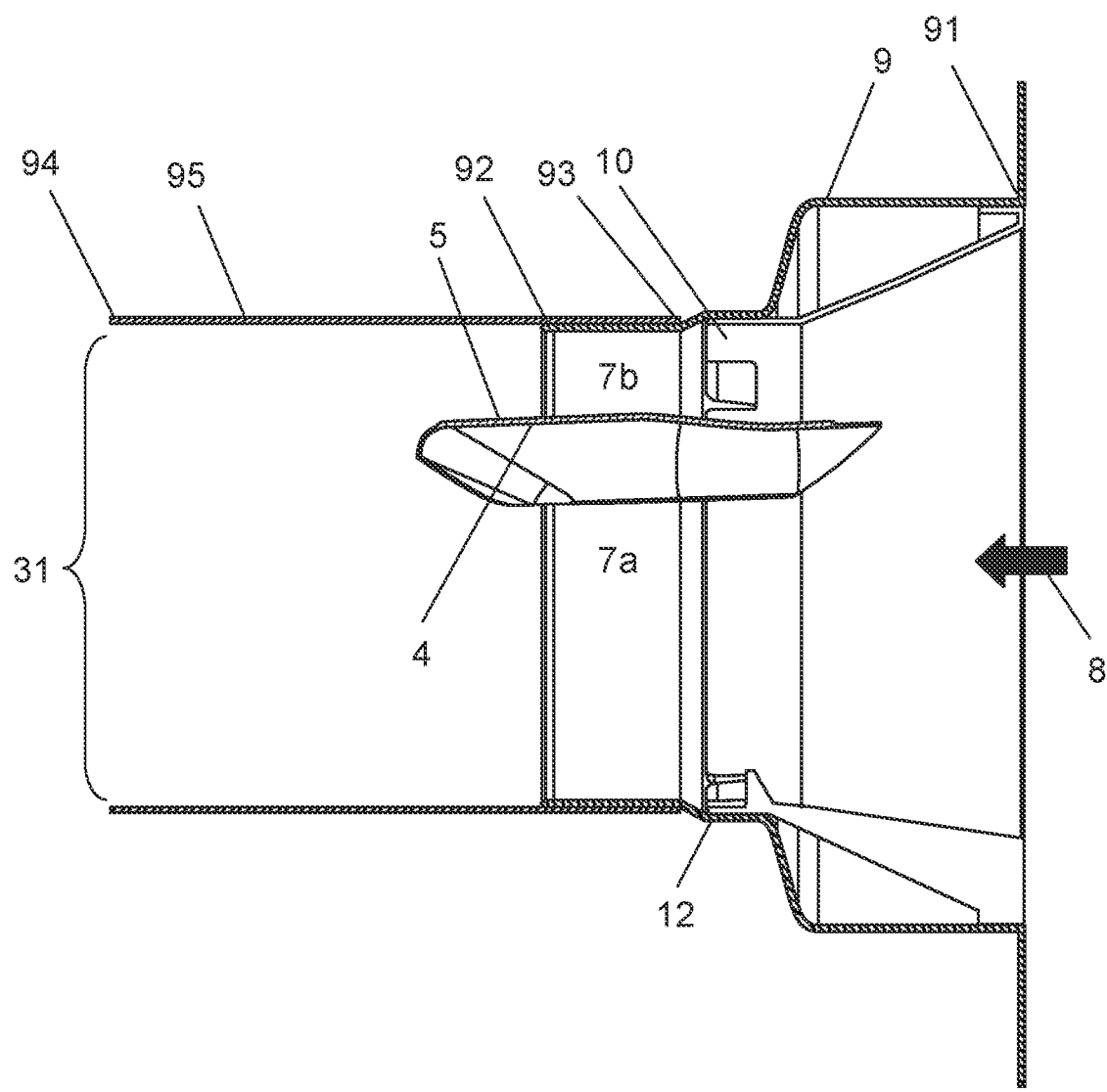
FIG. 4 is a cross-sectional view of an adapter according to Embodiment 1.
Figure 5:
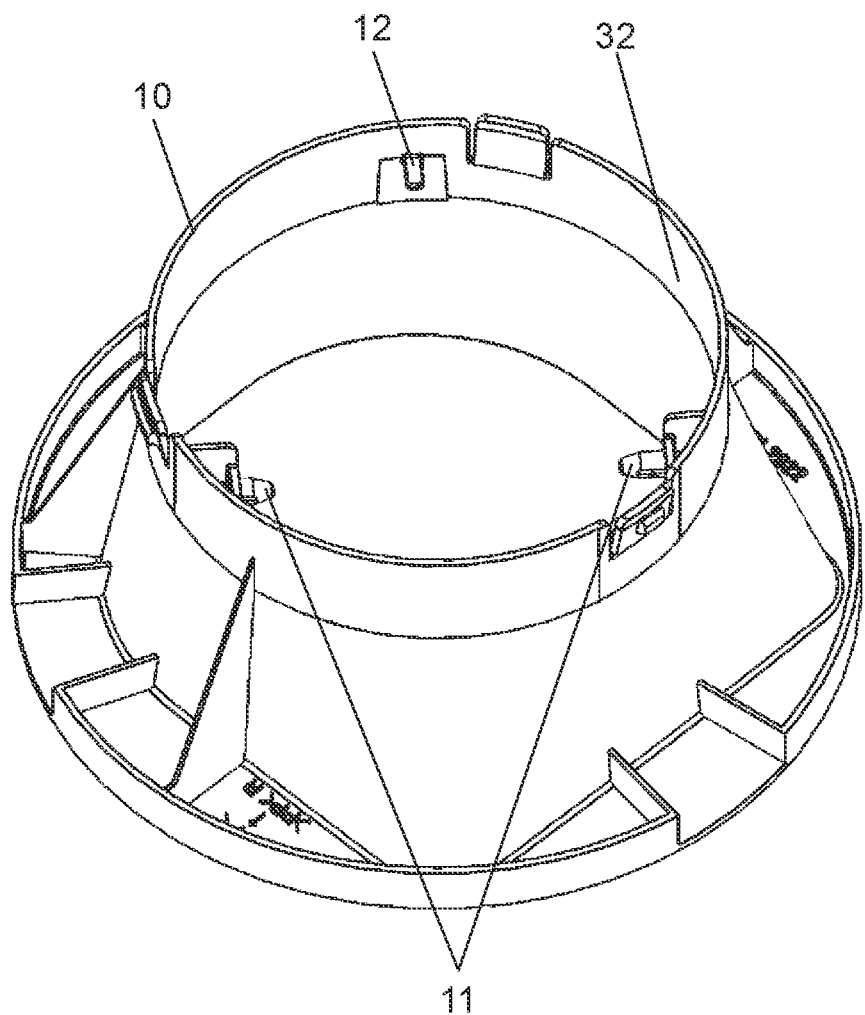
FIG. 5 is a perspective view of a shutter holder according to Embodiment 1.

Next, a specific example of arrangement of shutter 1 in passage 31 will be described using FIG. 4 and FIG. 5. Note that FIG. 4 is a cross-sectional view of an adapter and FIG. 5 is a perspective view of shutter holder 10.

Shutter 1 is configured to open and close cylindrical passage 31 through which an air current flows from upstream to downstream. When receiving a wind pressure generated by an air current, shutter 1 becomes in the open state. Passage inner wall 32 illustrated in FIG. 2A and FIG. 2B is an inner wall of adapter 9, for example.

Adapter 9 includes: first adapter end 91 connected to a casing for accommodating the air blowing unit; and second adapter end 92 connected to exhaust duct 95. Exhaust duct 95 includes: first duct end 93 connected to second adapter end 92 of adapter 9; and second duct end 94 arranged outside. Exhaust wind 8 from the air blowing unit is discharged outside via adapter 9 and exhaust duct 95. Adapter 9 is obtained by drawing a metal plate mainly suitable for pressing to make the plate into a cylindrical shape.

Shutter holder 10 may be mainly made of resin. In particular, as in the case of main body 2, polypropylene resin which is lightweight and flexible may be used as a material of shutter holder 10. As illustrated in FIG. 5, shutter holder 10 includes two shafts 11 and shutter stop 12. Shutter holder 10 is detachably mounted in adapter 9 inside adapter 9.

Each of two shafts 11 is a columnar protruding portion protruding inward from passage inner wall 32. Two shafts 11 are arranged on the same straight line. Each of shafts 11 is engaged with a corresponding one of insertion holes of shaft bearings 3.

Shutter stop 12 is configured to, when shutter 1 is in the closed state, come into contact with main-passage-side end 7c of main body 2 and thereby fix a closed position of main body 2. In the present embodiment, shutter stop 12 has a projection protruding toward the center of the cylinder of shutter holder 10 from an inner wall of shutter holder 10. Shutter stop 12 is configured to prevent shutter 1 from excessively moving.

Figure 6:
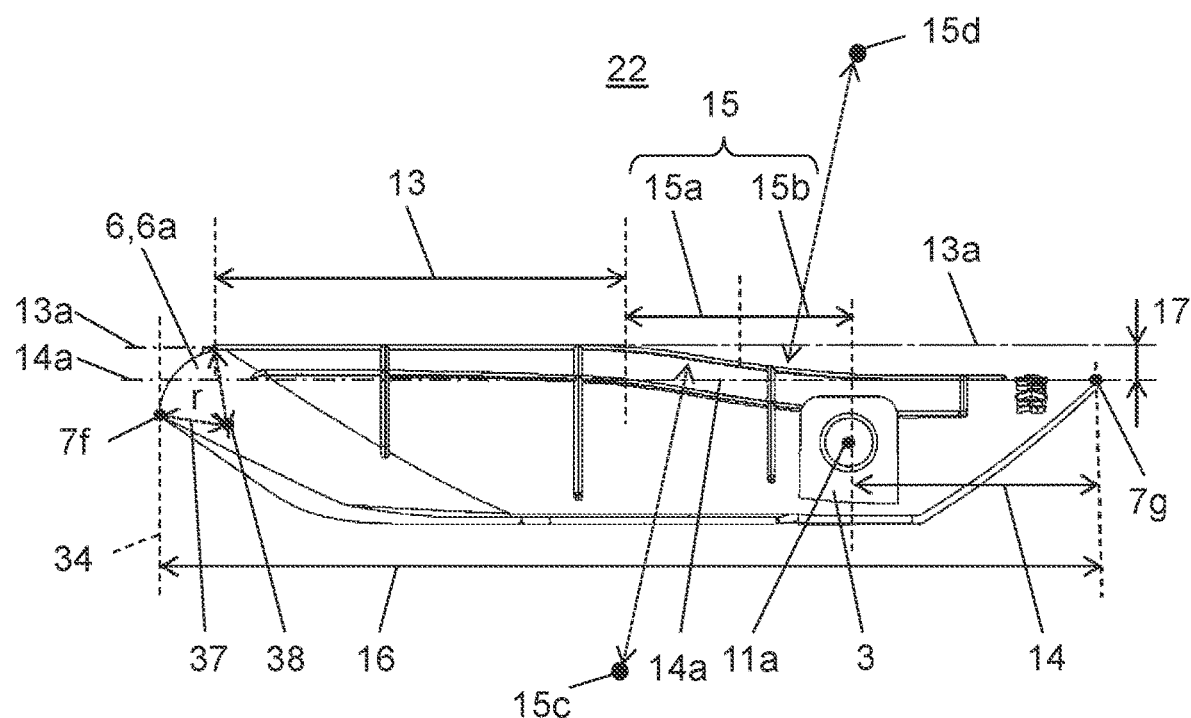
FIG. 6 is a side view of the shutter according to Embodiment 1.

Next, a detailed structure of shutter 1 will be described with reference to FIG. 6. Note that FIG. 6 is a side view of shutter 1 according to Embodiment 1.

In the vertical cross-section of shutter 1, main body 2 includes long side 13, short side 14, connection side 15, and curve side 6a.

Long side 13 is a side arranged in main passage 7a in the closed state. Long side 13 is located in main passage 7a in the closed state, and located downstream of rotation axis 11a of shutter 1 in the open state in passage 31.

Short side 14 is in sub-passage 7b in the closed state. Short side 14 is located in sub-passage 7b in the closed state, and located upstream in passage 31 from rotation axis 11a of shutter 1 in the open state.

Extension line 13a of long side 13 is parallel to extension line 14a of short side 14. That is, long side 13 is parallel to short side 14. Furthermore, long side 13 is located rearward 22 of short side 14, and a level difference is formed between long side 13 and short side 14. The distance between extension line 13a of long side 13 and extension line 14a of short side 14 is defined as level difference distance 17. Main body 2 includes: main-passage-side endmost portion 7f located in main passage 7a in the closed state; and sub-passage-side endmost portion 7g located in sub-passage 7b in the closed state. Distance 16 between sub-passage-side endmost portion 7g and main-passage-side endmost portion 7f is defined as the length of shutter 1, that is, a shutter length.

In the present embodiment, level difference distance 17 is 5% or less of the shutter length (distance 16). Curvature radius 37 of curve side 6a is 3% or more and 10% or less of the shutter length. Here, curvature radius 37 indicates radius r that is a distance from center (center of curvature) 38 of a circle having curve side 6a as a circular arc to the circular arc.

Connection side 15 connects an end on the sub-passage 7b side of long side 13 to an end on the main passage 7a side of short side 14. That is, connection side 15 is connected between long side 13 and short side 14. Specifically, connection side 15 includes long-side side connection side 15a and short-side side connection side 15b. Long-side side connection side 15a is connected to the end on the sub-passage 7b side of long side 13. That is, long-side side connection side 15a is connected to long side 13. Short-side side connection side 15b is connected to the end on the main passage 7a side of short side 14. That is, short-side side connection side 15b is connected to short side 14. Connection side 15 is inclined to long side 13 and short side 14.

Long-side side connection side 15a includes a main-passage-side bowed portion bowed in the direction from front face 4 to back face 5. In other words, in the vertical cross-section taken when the shutter is in the open state, long-side side connection side 15a has the shape of a curve projecting toward the sub-passage 7b side. Center of curvature 15c of this curve shape is located forward 21 of main body 2.

Short-side side connection side 15b includes a sub-passage-side bowed portion bowed in the direction from back face 5 to front face 4. In other words, in the vertical cross-section taken when the shutter is in the open state, short-side side connection side 15b has the shape of a curve projecting toward the main passage 7b side. Center of curvature 15d of this curve shape is located rearward 22 of main body 2.

Curve side 6a is formed at main-passage-side end 7c of long side 13. That is, curve side 6a is connected to an end of long side 13, the end being located opposite to connection side 15. Curve side 6a corresponds to bent portion 6 and has a circular arc shape. Curve side 6a has tangent 34 at main-passage-side endmost portion 7f. Tangent 34 is at right angles to extension line 13a of long side 13 and extension line 14a of short side 14.

Up to this point, the configuration of shutter 1 has been described.

Next, the operation of shutter 1 and the action of each part will be described.

Long side 13 of main body 2 is longer than short side 14 thereof. Shaft bearing 3 is located closer to short side 14. Accordingly, when air current 30 is absent or weak, shutter 1 becomes in the closed state under its own weight.

The air blowing unit produces air current 30 that flows through the inside of passage 31 from upstream to downstream.

When air current 30 collides with front face 4 of shutter 1, then air current 30 pushes up long side 13 of main body 2 in the downstream direction of passage 31 to let long side 13 rotate on rotation axis 11a. Here, rotation axis 11a is not arranged on the diameter of passage 31, and accordingly, in the opened state, passage 31 is divided into main passage 7a and sub-passage 7b. The distance from shaft bearing 3 to main-passage-side endmost portion 7f of main body 2 is longer than the distance from shaft bearing 3 to sub-passage-side endmost portion 7g of main body 2.

With this configuration, a force of air current 30 to push up shutter 1, in other words, the moment of a force acting in the direction that opens shutter 1 can be increased. This is effective in particular when the wind velocity of air current 30 is low and accordingly the wind pressure of air current 30 is low.

Note that FIG. 2A illustrates shutter 1 in the fully open state. That is, main-passage-side end 7c is held at a substantially 90° position. FIG. 2B illustrates shutter 1 in the closed state. That is, main-passage-side end 7c is held at a 0° position. When the wind velocity of air current 30 is low, main-passage-side end 7c is held at a 0° position or more and a 90° position or less, for example, held at a 45° position.

Here, shutter 1 includes bent portion 6. In the parallel cross-section (FIG. 3B) of shutter 1, main body 2 has a circular arc shape bowed toward the back face 5 side from the front face 4 side over a range of from sub-passage-side end 7d to main-passage-side end 7c. Center 43 of the circular arc shape is arranged rearward 22 of first end 41 and second end 42 to form first inclined face 44 and second inclined face 45. Thus, when shutter 1 is shifted from the closed state to the open state, main body 2 allows air current 30 having collided with first inclined face 44 and second inclined face 45 to deflect to center 43. In other words, main body 2 is capable of focusing air current 30 on center 43 of main body 2. Air current 30 flows in a direction from sub-passage-side end 7d to main-passage-side end 7c of main body 2 along front face 4 of main body 2, and collides with bent portion 6. Thus, even when air current 30 is weak, that is, the wind velocity of air current 30 is low and accordingly the wind pressure thereof is low, a force to push up shutter 1, in other words, the moment of a force acting in the direction that opens shutter 1 can be increased.

In shutter 1, the curvature radius of bent portion 6 is 6 mm. This radius is slightly less than 6% of the shutter length.

In the present embodiment, curve side 6a has tangent 34 at main-passage-side endmost portion 7f, tangent 34 being vertical to extension line 13a of long side 13. The curvature radius of bent portion 6 determines how forward 21 main-passage-side endmost portion 7f is located in main body 2. When bent portion 6 has a larger curvature radius, bent portion 6 more effectively receives air current 30 in the closed state, but, in the open state, the projected area of shutter 1 seen from air current 30, that is, ventilation resistance of shutter 1 is increased. Hence, the curvature radius of bent portion 6 is preferably 3% or more and 10% or less of the full length of shutter 1.

Thus, even when the wind velocity of air current 30 is low, air current 30 collides with bent portion 6 so as to be caught at bent portion 6, whereby shutter 1 can be more easily pushed up. In addition, ventilation resistance of shutter 1 can be lowered.

Figure 7A:
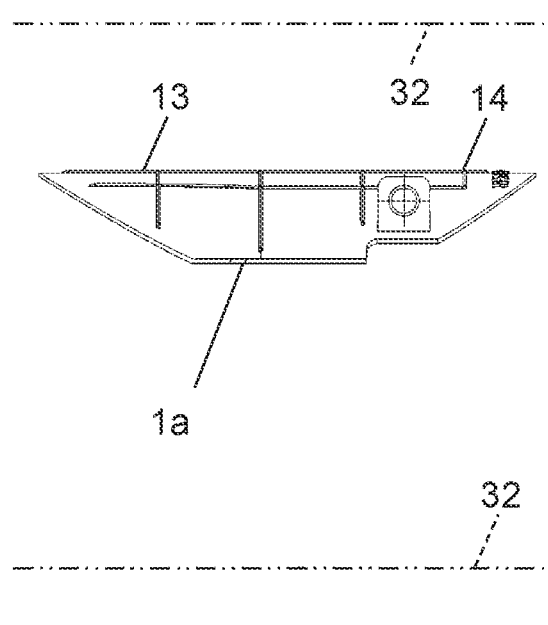
FIG. 7A is a side view of a shutter according to Modification of Embodiment 1.
Figure 7B:
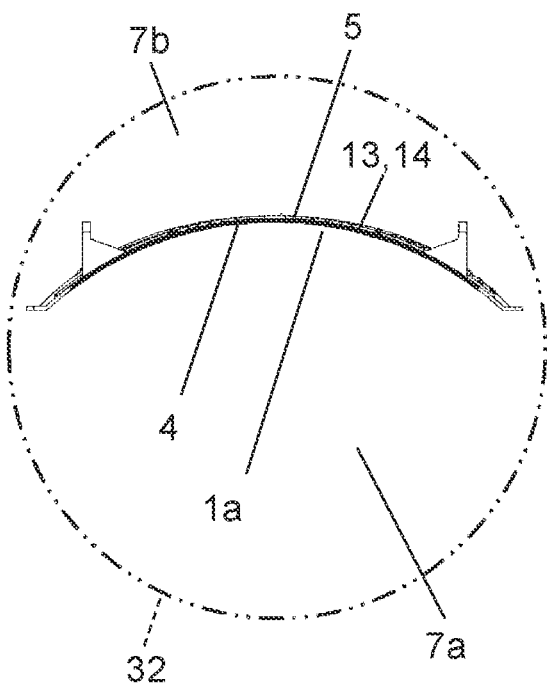
FIG. 7B is a parallel cross-sectional view of the shutter according to Modification.

Hereinafter, the effects of long side 13, short side 14, and connection side 15 will be described. Connection side 15 forms a level difference between long side 13 and short side 14. First, an action in the case where connection side 15 is not provided will be described. FIG. 7A and FIG. 8A are side views of shutter 1a according to Modification of Embodiment 1. FIG. 7B and FIG. 8B are parallel cross-sectional views of shutter 1a. Shutter 1a includes long side 13 and short side 14, but does not include connection side 15.

As illustrated in FIG. 7A, theoretically, shutter 1a is parallel to passage inner wall 32, in other words, it is assumed that shutter 1a is in the fully open state in which shutter 1a is opened at 90° with respect to the closed state. In this case, in a projected figure formed by projecting shutter 1a from upstream to downstream in passage 31, that is, a projected figure of a parallel cross-section taken from sub-passage-side end toward main-passage-side end, long side 13 and short side 14 are located on the same line as illustrated in FIG. 7B. At this time, the projected area of shutter 1a is equal to the area of a portion corresponding to only the thickness of shutter 1a, in other words, takes on the minimum value.

However, when shutter 1a is opened 90°, the force of air current 30 passing through main passage 7a to push up shutter 1 becomes 0, and accordingly, shutter 1a approaches the closed state under its own weight. Therefore, actually, shutter 1a cannot continue to open 90°. The angle of shutter 1a in the fully open state depends on a balance between a wind pressure from air current 30 and the own weight of shutter 1a. Realistically, as illustrated in FIG. 8A, the angle of shutter 1a in the fully open state is estimated at up to substantially 85°.

As shown in FIG. 8B, thickness 39 in the projected figure of shutter 1a in the fully open state is larger than the thickness in the projected figure of shutter 1a illustrated in FIG. 7B. That is, thickness 39 of shutter 1a varies depending on how much shutter 1a is inclined (here, 5°, obtained by subtracting 85° from 90°). Thickness 39 of shutter 1a causes a large resistance to air current 30. Furthermore, this resistance causes flapping of the shutter, that is, causes a pulsating sound.

In contrast, shutter 1 includes connection side 15. In the present embodiment, level difference distance 17 between long side 13 and short side 14 is 4 mm. FIG. 3B is a projected figure of shutter 1 in the fully open state. Shutter 1 illustrated in FIG. 3B has a smaller thickness and a smaller projected area than those of shutter 1a illustrated in FIG. 8B. Hence, shutter 1 illustrated in FIG. 3B has a lower ventilation-resistance than that of shutter 1a illustrated in FIG. 8B. Note that, actually, shutter 1 further includes bent portion 6. FIG. 9B is an actually projected figure of shutter 1. Shutter 1 illustrated in FIG. 9B has a larger thickness and a larger projected area than those of shutter 1a illustrated in FIG. 8B. That is, as illustrated in FIG. 9B, compared with a projected portion formed by long side 13, short side 14, and connection side 15, a projected portion formed by bent portion 6 (curve side 6a) is located closed to the front face 4 side. In the projected figure of FIG. 9B, front face 4 has first projected-figure end 23 which is an end of curve side 6a, the end being located most forward 21. Front face 4 further includes second projected-figure end 24 that is an end of a side formed of long side 13, short side 14, and connection side 15, the end being located most forward 21. First projected-figure end 23 is located forward 21 of second projected-figure end 24. In other words, when the projected area of bent portion 6 of shutter 1 is compared with the projected area of long side 13, short side 14, and connection side 15, the projected area of bent portion 6 is larger only by difference-in-bowing 40. Shutter 1 illustrated in FIG. 9B is seemingly at a disadvantage in terms of ventilation resistance. However, actually, the force of air current 30 to open shutter 1 from the main passage 7a side efficiently acts on bent portion 6. Hence, in particular at a low wind-velocity, such configuration is effective in stably holding shutter 1 at the open position.

As for level difference distance 17, when the opening angle of the shutter is smaller, that is, when the shutter is in a state closer to the closed state, level difference distance 17 is bigger, whereby the projected area of shutter 1 seen from air current 30, that is, the ventilation resistance of shutter 1 is lowered, which is advantageous. However, air resistance is proportional to the square of wind velocity. Hence, the level difference caused by connection side 15 provides effects in particular when the wind velocity of air current 30 is high. That is, the degree of level difference distance 17 may be determined in accordance with an operation mode in which shutter 1 is in a state closer to the fully open state. The diameter of the cylindrical shape of adapter 9 is defined by a commercial exhaust duct. The exhaust duct commonly has an inner diameter of substantially 4 inches. The full length of shutter 1 is less than 100 mm. Level difference distance 17 is preferably 5% or less of the full length of shutter 1.

Furthermore, shutter 1 can be stably kept in the open state even when the wind velocity of air current 30 is low, and therefore, shutter 1 is effective in the case where shutter 1 is combined with the air blowing unit configured to exercise constant airflow rate control in accordance with the resistance of passage 31. That is, under the constant airflow rate control, when shutter 1 becomes in the open state, a controller determines that, from the relationship between the rotation speed of an exhaust fan and the power consumption of a motor, exhaust volume has increased too much. Accordingly, the controller lowers the output of the motor to reduce the exhaust volume. Shutter 1 is capable of being stably kept in the open state even when the wind velocity of air current 30 is low, and therefore is never closed. Thus, pulsating sounds of air current 30 and sounds caused by repeated contacts of shutter 1 with shutter stop 12 can be prevented from generating.

Note that, in the descriptions above, strictly speaking, FIG. 7B, FIG. 8B, and FIG. 3B are parallel cross-section views, but, are also regarded as projected figures because these figures are almost in agreement with a projected figure formed by projecting the shutter in a direction from upstream to downstream in passage 31.

Embodiment 2

Figure 10:
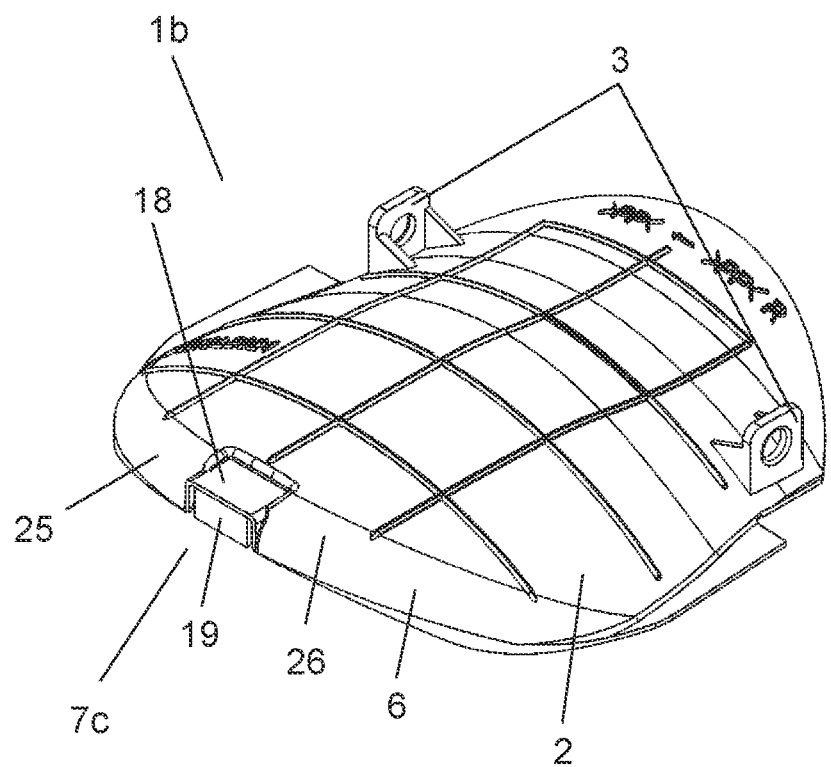
FIG. 10 is a perspective view of a shutter according to Embodiment 2 of the present invention.

In the present embodiment, shutter 1b different from the shutter of Embodiment 1 will be described. As illustrated in FIG. 10, besides constituents of shutter 1 described in Embodiment 1, shutter 1b further includes notch 18 and elastic portion 19.

Notch 18 divides bent portion 6 into two portions in the width direction of shutter 1b at main-passage-side end 7c of main body 2. Notch 18 has the shape of a recess bowed toward the back face 5 side from front face 4, and the recess is located on the front face 4 side. In other words, bent portion 6 includes first sub-bent-portion 25 and second sub-bent-portion 26 that are separated from each other via notch 18 (gap).

Elastic portion 19 is housed in a recessed space of the recess in notch 18, as needed. Elastic portion 19 is stuck on notch 18. In the closed state, elastic portion 19 is in contact with shutter stop 12. For cushioning, elastic portion 19 is made of polyethylene or ethylene propylene diene methylene (EPDM).

In the closed state, shutter 1b is in contact with shutter stop 12. When bent portion 6 comes into direct contact with shutter stop 12, a sharp contact sound is generated by line-contact of an end of bent portion 6 with shutter stop 12. In contrast, when elastic portion 19 comes into contact with shutter stop 12, a soft contact sound is generated by face-contact of notch 18 or elastic portion 19 with shutter stop 12, and furthermore, the sound itself is smaller, and thus contact sounds can be reduced.

The shutter according to the present invention is capable of reducing a contact sound and a pulsating sound, and is useful for air blowing units for ventilation equipment.

What is claimed is:
1. A shutter configured to open and close a cylindrical passage through which an air current flows from upstream to downstream, the shutter comprising:
   a main body in which a front face of the main body is located upstream of a back face of the main body in the cylindrical passage when the shutter is in a closed state to close the cylindrical passage, the main body having a substantially circular plate shape; and
a shaft bearing configured to be rotatably engaged with a shaft configured to divide the cylindrical passage into a main passage and a sub-passage when the shutter is in an open state to open the cylindrical passage, the sub-passage having a cross-sectional area smaller than a cross-sectional area of the main passage,
the main body including:
   a main-passage-side end located inside the main passage in the closed state;
   a sub-passage-side end located in the sub-passage in the closed state; and
   a bent portion bent at the main-passage-side end in a direction from a back face side to a front face side,
wherein a first cross-section of the main body, the first cross-section being taken along a parting plane parallel to the shaft, has a circular arc shape projecting in a direction from the front face side to the back face side,
wherein, in a vertical cross-section of the main body, the vertical cross-section being taken along a parting plane perpendicular to the shaft, the main body further includes:
a short side arranged inside the sub-passage in the closed state;
a long side arranged inside the main passage in the closed state;
a connection side connecting the short side with the long side; and
a curve side, corresponding to the bent portion, formed at the main-passage-side end of the main body, a length of a curvature radius of the curve side being less than a length of the long side;
wherein the connection side includes:
   a sub-passage-side bowed portion located on a short-side side and bowed in a direction from the back face to the front face; and
   a main-passage-side bowed portion located on a long-side side and bowed in a direction from the front face to the back face.

2. The shutter according to claim 1,
wherein the long side is arranged in parallel to the short side.

3. The shutter according to claim 2,
wherein the main body has a shutter length equal to a distance from a sub-passage-side endmost portion to a main-passage-side endmost portion in the closed state,
the long side, having a first level, is located rearward of the short side having a second level, and the long side and the short side having a level difference that is 5% or less of the shutter length.

4. The shutter according to claim 1,
wherein, in a projected figure of the first cross-section toward the main-passage-side end of the main body from the sub-passage-side end of the main body, the front face includes:
a first projected-figure end located close to the front face side and formed by the bent portion; and
a second projected-figure end located close to the front face side and formed by the long side, the short side, and the connection side,
the first projected-figure end being located closer to the front face side than the second projected-figure end.

5. The shutter according to claim 1,
wherein a tangent at a main-passage-side endmost portion is at a right angle to an extension line extended from the long side.

6. The shutter according to claim 1,
wherein the main body has a shutter length equal to a distance from a sub-passage-side endmost portion to a main-passage-side endmost portion, and
the curvature radius of the curve side is 3% or more and 10% or less of the shutter length.

7. The shutter according to claim 1, further comprising:
a notch which divides the bent portion into two portions, the notch being provided in a main-passage-side endmost portion of the main body, the main-passage-side endmost portion being located inside the main passage in the closed state; and
an elastic portion which is filled in the notch to connect the two portions obtained by dividing the bent portion.

8. An air blower, comprising:
a cylindrical passage;
a shaft configured to divide the cylindrical passage into a main passage and a sub-passage when the cylindrical passage is open;
a shutter configured to open and close the cylindrical passage through which an air current flows from upstream to downstream, the shutter being rotatable engaged with the shaft, the shutter comprising:
a main body in which a front face of the main body is located upstream of a back face of the main bod in the cylindrical passage when the shutter is in a closed state to close the cylindrical passage, the main body having a substantially circular plate shape; and
a shaft bearing configured to be rotatably engaged with the shaft configured to divide the cylindrical passage into the main passage and the sub-passage when the shutter is in an open state to open the cylindrical passage, the sub-passage having a cross-sectional area smaller than a cross-sectional area of the main passage,
the main body including:
   a main-passage-side end located inside the main passage in the closed state;
   a sub-passage-side end located in the sub-passage in the closed state; and
   a bent portion bent at the main-passage-side end in a direction from a back face side to a front face side,
   wherein a first cross-section of the main body, the first cross-section being taken along a parting plane parallel to the shaft, has a circular arc shape projecting in a direction from the front face side to the back face side,
   wherein, in a vertical cross-section of the main body, the vertical cross-section being taken along a parting plane perpendicular to the shaft, the main body further includes:
      a short side arranged inside the sub-passage in the closed state;
      a long side arranged inside the main passage in the closed state;
      a connection side connecting the short side with the long side; and
      a curve side, corresponding to the bent portion, formed at the main-passage-side end of the main body, a length of a curvature radius of the curve side being less than a length of the long side;
   wherein the connection side includes:
      a sub-passage-side bowed portion located on a short-side side and bowed in a direction from the back face to the front face; and
      a main-passage-side bowed portion located on a long-side side and bowed in a direction from the front face to the back face; and an air blowing unit configured to blow air toward the shutter from the upstream side of the cylindrical passage under constant airflow rate control.

9. A shutter configured to open and close a cylindrical passage through which an air current flows from upstream to downstream, the shutter comprising:
- a main body in which a front face of the main body is located upstream of a back face of the main body in the cylindrical passage when the shutter is in a closed state to close the cylindrical passage, the main body having a substantially circular plate shape; and
- a shaft bearing configured to be rotatably engaged with a shaft configured to divide the cylindrical passage into a main passage and a sub-passage when the shutter is in an open state to open the cylindrical passage, the sub-passage having a cross-sectional area smaller than a cross-sectional area of the main passage, the main body including:
- a main-passage-side end located inside the main passage in the closed state;
- a sub-passage-side end located in the sub-passage in the closed state; and
- a bent portion bent at the main-passage-side end in a direction from a back face side to a front face side,
- wherein a first cross-section of the main body, the first cross-section being taken along a parting plane parallel to the shaft, has a circular arc shape projecting in a direction from the front face side to the back face side, wherein, in a vertical cross-section of the main body, the vertical cross-section being taken along a parting plane perpendicular to the shaft, the main body further includes:
- a short side arranged inside the sub-passage in the closed state;
- a long side arranged inside the main passage in the closed state;
- a connection side connecting the short side with the long side; and
- a curve side corresponding to the bent portion formed at the main-passage-side end in the closed state;

wherein the connection side includes:
- a sub-passage-side bowed portion located on a short-side side and bowed in a direction from the back face to the front face; and
- a main-passage-side bowed portion located on a long-side side and bowed in a direction from the front face to the back face.

* * * * *